United States Patent [19]

Bieber

[11] Patent Number: 4,897,790

[45] Date of Patent: Jan. 30, 1990

[54] CONTROL ARRANGEMENT FOR THE SHIFTING OF VARIABLE CHANGE SPEED GEARS

[75] Inventor: Gerold Bieber, Langenargen, Fed. Rep. of Germany

[73] Assignee: Zahnradfabrik Friedrichshafen, AG., Friedrichshafen, Fed. Rep. of Germany

[21] Appl. No.: 930,369

[22] PCT Filed: Mar. 12, 1986

[86] PCT No.: PCT/EP86/00134

§ 371 Date: Nov. 14, 1986

§ 102(e) Date: Nov. 14, 1986

[87] PCT Pub. No.: WO86/05449

PCT Pub. Date: Sep. 25, 1986

[30] Foreign Application Priority Data

Mar. 23, 1985 [EP] European Pat. Off. ..... 85/00124LU

[51] Int. Cl.$^4$ ............ B60K 41/06; G06F 15/20
[52] U.S. Cl. ................. 364/424.1; 74/866
[58] Field of Search ............ 364/424.1; 74/866

[56] References Cited

U.S. PATENT DOCUMENTS

| | | | |
|---|---|---|---|
| 3,628,642 | 12/1971 | Ravenel | 74/866 X |
| 4,262,335 | 4/1981 | Ahlen et al. | 364/424.1 |
| 4,361,060 | 11/1982 | Smyth | 74/866 |
| 4,425,620 | 1/1984 | Batcheller et al. | 364/424.1 |
| 4,517,646 | 5/1985 | Magnusson et al. | 364/424.1 |
| 4,524,645 | 6/1985 | Tatsumi et al. | 74/866 |
| 4,551,802 | 11/1985 | Smyth | 364/424.1 |
| 4,576,065 | 3/1986 | Speranza et al. | 74/866 |
| 4,630,508 | 12/1986 | Klatt | 74/866 |

FOREIGN PATENT DOCUMENTS

| | | |
|---|---|---|
| 120189 | 10/1984 | European Pat. Off. . |
| 121168 | 10/1984 | European Pat. Off. . |
| 3337930 | 7/1984 | Fed. Rep. of Germany . |
| 1266654 | 3/1972 | United Kingdom . |
| 2097073 | 10/1972 | United Kingdom . |
| 2042658 | 9/1980 | United Kingdom . |

OTHER PUBLICATIONS

Notes: Ref. O Corresponds to U.S. H M, Corresponds to U.S. B, N Corresponds to U.S. I.

Primary Examiner—Felix D. Gruber
Attorney, Agent, or Firm—Albert M. Zalkind

[57] ABSTRACT

A control system for the automatic shifting of variable change speed transmission by an electronic control unit through which drive ratio change is determined in accordance with vehicle speed, instantaneous load demand and acceleration calculated from the speed of the driven shaft of the transmission. Drive ratio change command programs based on the behavior of a very good driver manually controlling a comparable transmission, are stored in the control unit to assign varying numbers of the available gear ratios to different combinations of sensed conditions under which automatic drive ratio change is effected.

11 Claims, 4 Drawing Sheets

CONTROL ARRANGEMENT FOR THE SHIFTING OF VARIABLE CHANGE SPEED GEARS

BACKGROUND OF THE INVENTION

This invention relates to a drive ratio control system for a change speed gear transmission driven by an automotive vehicle engine, having a gear ratio selector through which the transmission is conditioned for forward drive and reverse travel, with automatic gear ratio shifting during forward drive in response to changes in output speed and load demand as reflected by the position of the engine fuel control or accelerator pedal.

According to the prior art, change speed gear transmissions for motor vehicles are automatically shifted through a range of available forward drive ratios in dependence on output speed and load demand determining a plurality of shift points, load demand being reflected by the positioning of the accelerator pedal between full load (kick-down) and idling positions. Certain of such forward drive ratios may be excluded from the gear shift sequence under control of the driver by means of a selector, during downhill travel for example. Besides the standard forward drive, neutral and reverse travel positions of such a selector, additional selector positions have been provided to correspondingly limit automatic shift to low, second and third speed ratios.

The foregoing types of automatic transmission control systems are capable of providing flexibility for the driver in connection with gearing having relatively few available gear ratios. In connection with multi-speed gear transmissions having a larger number of available gear ratios, both high and low gear ratios of the automatic shift range may be excluded by displacement of two selector levers, to achieve desirable travel conditions under idling and partial load demand positions of the fuel control pedal. According to yet other known automatic transmission control system, changes in shift points for fuel economy purposes is achieved during vehicle travel by means of a selector.

In addition to the selective exclusion of low and high speed ratios at opposite ends of an automatic shift sequence of available speed ratios, as aforementioned, it has also been proposed to select a sequence of speed raios under a predetermined shifting mode in accordance with actual vehicle acceleration to reduce the number of available speed ratios utilized. For example, in a 16-speed gear transmission, the drive ratio range utilized may consist of fewer speed ratios by skipping some of the 16 available speed ratios, with those speed ratios utilized being spaced from each other either equally or unequally, or some combination thereof predetermined by the shift pattern selected from a data storage file. Thus, depending on the drive conditions in the drive train of the entire transmission, fewer speed ratios may be utilized to reduce the amount of gear shifting operations.

None of the aforementioned automatic control systems are satisfactory for gear transmission arrangements in which the drive train and engine relationships are designed to favor economical fuel or energy consumption. For such fuel efficient arrangements, the maximum engine torque often accommodates the desired acceleration to be achieved under timely and sensible gear shift operation. With respect to the usual automatic gear transmission having relatively few speed ratios, the duration between gear shift operations varies with vehicle speed for which reason the frequency of shift presents no problem. For transmissions having a large number of available speed ratios, proper separation between the high speed ratios at one end of the gear shift sequence does reduce the frequency of shifting operations, but imposes relatively high demands on the driver and limits automatic adaptation of the control system to different driving conditions. Unsatisfactory adaptation to driving conditions associated with such automatic gear shift operations arises because of the inflexibility of the sequence of speed ratios over the entire drive range of the transmission while the frequency of shift operations is being reduced. The sacrifice in adaptability to driving conditions does not justify the reduced frequency in automatic shifting operations.

It is therefore an important object of the present invention to provide a transmission control system which achieves optimum adaptation of the drive train to the engine characteristics for favorable fuel or energy consumption while maintaining effective skip of available gear speed ratios to reduce the frequency of automatic shifting operations under different travel conditions, and without any sacrifice in the wear and tear of parts to thereby increase the life span of the gear shifting elements.

SUMMARY OF THE INVENTION

In accordance with the present invention, a multi-speed gear transmission is automatically upshifted and downshifted in the forward travel drive range by utilization of different numbers of the available gear ratios under programmed commands based on optimum selection criteria involving the assignment of such different numbers of the gear ratios, respectively, to the automatic control shift points, heretofore dependent on output speed and load demand (position of fuel control pedal).

Thus, the automatic drive ratio control system of the present invention while taking into account the dynamic conditions in the drive train aforementioned, including acceleration, is not merely limited to the speed and demand factors in the determination of the control shift points and the selection of speed ratios, but may also approximate additional drive conditions associated with exclusive manual shift transmissions wherein a good driver selects the shift point and speed ratio with due consideration to the dynamic reaction of the vehicle to changes in external travel conditions, such as gradient and wind, as well as the position of the fuel control pedal. In accordance with the present invention, such additional factors are especially applicable to a multi-speed gear transmission through which optimum drive train adaptations may account for favorable fuel economy. Every skip, jump or omission of a gear shifting operation necessary for the optimum drive train adaptation, as well as unnecessary gear shifting operations, leads to a decrease in effectiveness of the drive train during vehicle travel. For that reason, the assignment of gear shift commands to the shift control points covering different numbers of speed ratios in accordance with the present invention, is of particular advantage.

In the case of transmission gearing having many closely spaced gear ratios, an excessively high frequency of gear shift operations with associated wear and tear and loss of speed, may be avoided in accordance with the present invention by a selection of speed ratios based on factors which include acceleration and momentary load demands without sacrificing favorable fuel consumption. The present invention is furthermore particularly advantageous for gear transmissions having overlapping gear shifts, especially characterized by interruptions in propelling force during such gear shifts, since each unnecessary shifting operation results in considerable losses and a decrease in effectiveness.

The use of acceleration as a factor in determining shift points, in combination with the distinctions of the present invention, involves readily performed mathematical calculations with data obtained from the sensing of output speed. Also, momentary load demand may be readily determined from the detection of fuel control pedal position, for example. By timing displacement of the fuel control pedal or lever, momentary load demand data may be utilized in the determination of dynamic conditions in the drive train without use of high load demand data available, for example, from the accelerator fuel pump.

Whenever a transmission control system modified in accordance with the present invention provides an optional manual shift mode of operation, the driver may disable the automatic upshift operation upon recognizing a road obstacle adhead of the vehicle, such as the top of a mountain. Such obstacles may be overcome with the gear transmission maintained in the gear ratio just established followed by automatic downshift after a considerable delay. In the case of a vehicle passing situation, automatic upshift may be prevented in accordance with another aspect of the present invention as a result of increased momentary load demand (full throttle position) causing immediate downshift. With such downshift arrangement, unnecessary gear shift operations are prevented. Necessary gear shift modifications may nevertheless be accomplished at all times by one speed upshift or downshift in response to directional displacement of a selection lever pursuant to the present invention. Furthermore, by changing to the manual shift mode, the speed ratio previously established under the automatic mode may be maintained while enabling automatic downshift at all times.

BRIEF DESCRIPTION OF DRAWING FIGURES

Additional details of the invention will be explained on the basis of embodiments by way of example with reference to the drawings, wherein.

DETAILED DESCRIPTION OF PREFERRED EMBODIMENT

Figure 1:
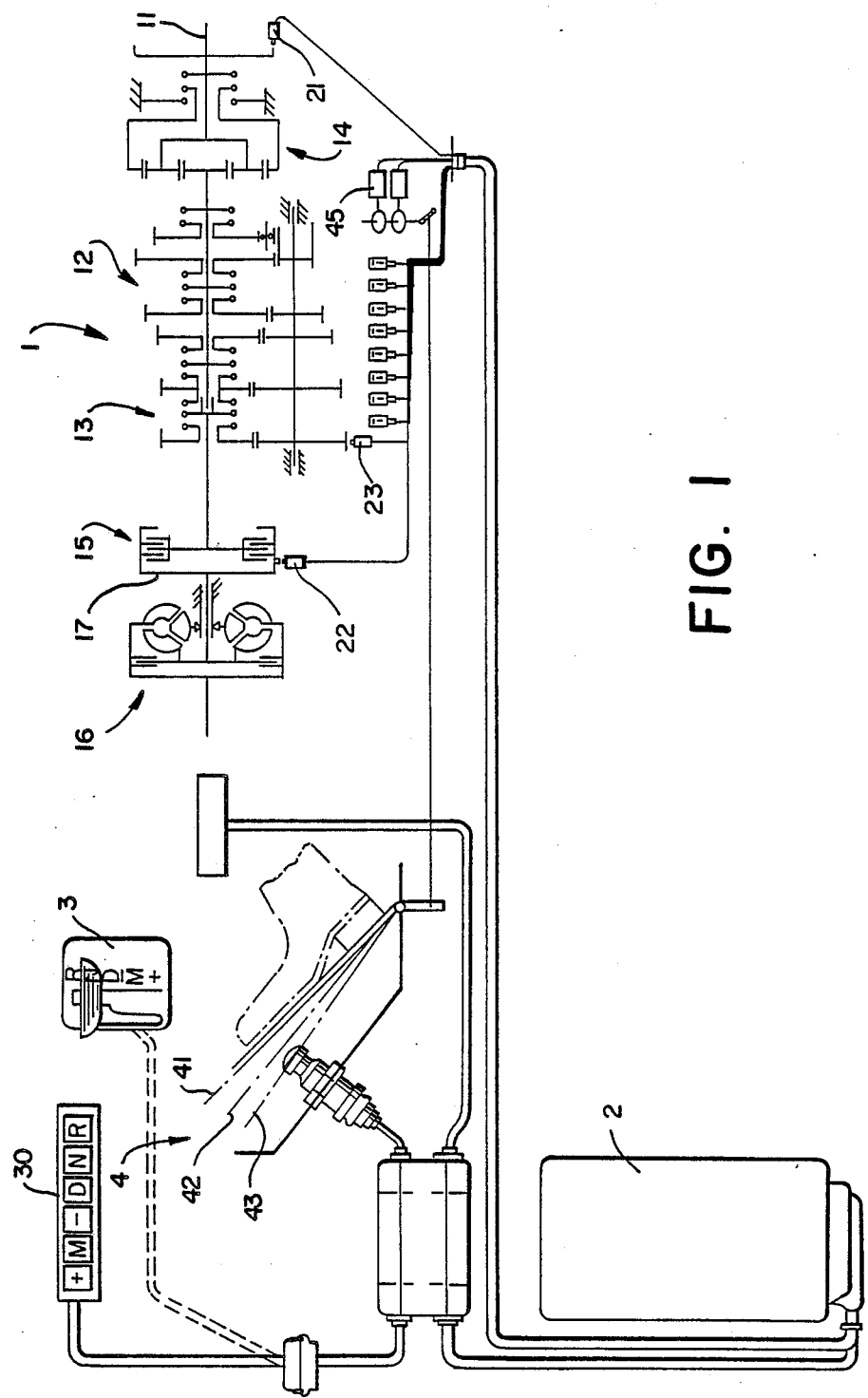
FIG. 1 is a schematic illustration of an automatic gear transmission and associated control system.
Figure 4:
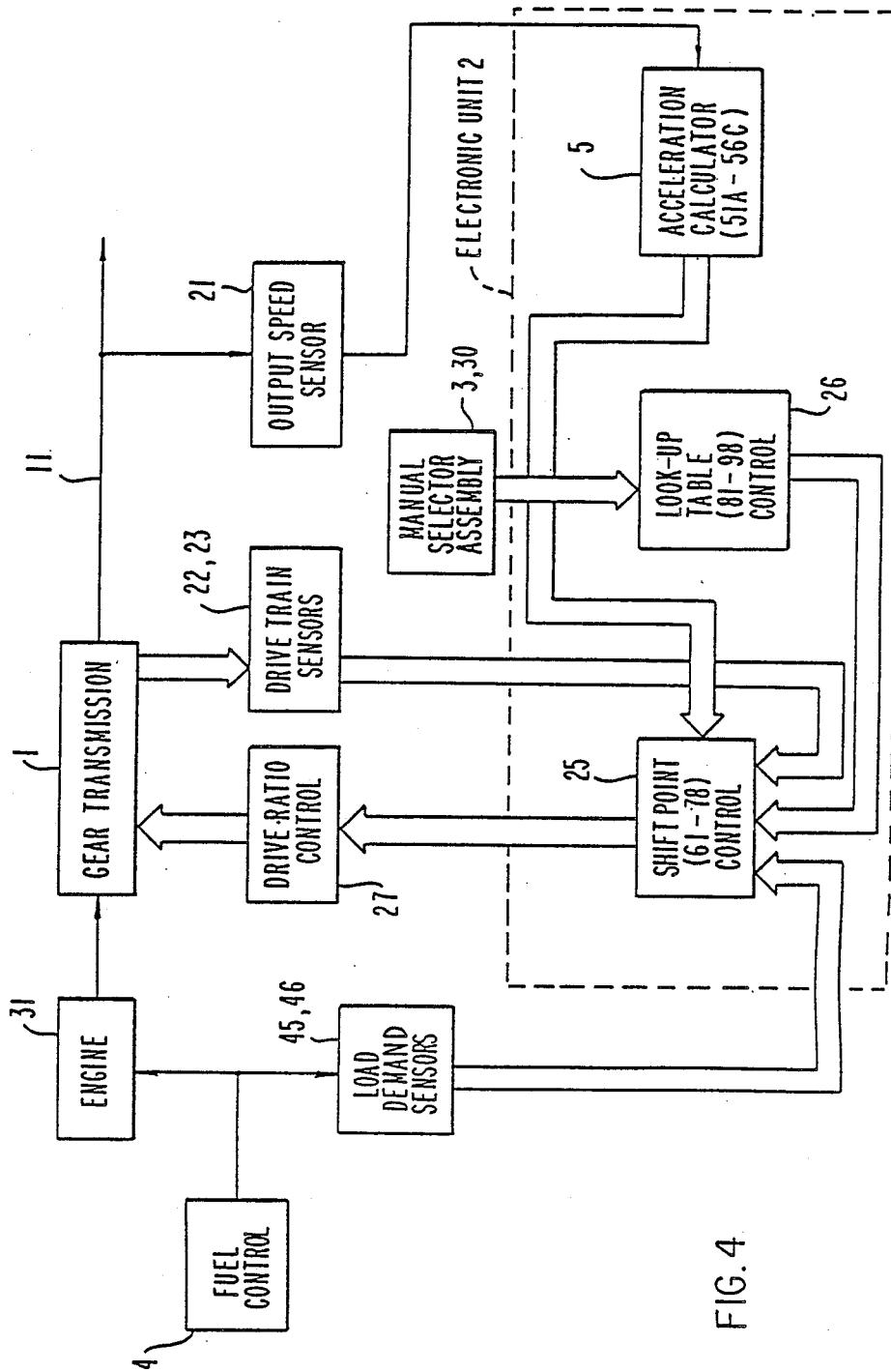
FIG. 4 is a functional block diagram depicting the operational relationships described with reference to FIGS. 1, 2 and 3.

The change speed gear transmission 1 as schematically illustrated in FIG. 1 and diagrammed in FIG. 4 is a 16-speed synchronized gear assembly driven by a vehicle engine 31 as shown in FIG. 4. The gear assembly consists of a 4-speed gear set 12, a drive splitting gear set 13 and a forward and reverse drive gear set 14. Also, a drive engaging coupling 15 and a hydrodynamic torque converter 16 with a by-pass coupling is associated with the gear transmission.

An electronic unit 2 as diagrammed in FIGS. 1 and 4 receives a plurality of speed signals. The speed signals are respectively generated by sensors 21, 22 and 23 in response to (a) rotation of driven gear shaft 11 of the transmission; (b) rotation of a turbine driven shaft 17; and (c) transmission of torque by the coupling 15 reflected by rotation of the counter shaft gear of gear set 13.

A displacement selector assembly formed by a panel lever control 3 and a push button activator 30 are provided with operative positions marked P (parking), R (reverse travel) and N (neutral) as well as D (forward travel) for an automatic drive range. Additional displacement control is provided at actuator position M together with directional position controls (plus and minus) as shown in FIG. 1 for manual gear shifting operation by the driver. The gear ratio, established for the transmission automatically, is maintained when the actuator M of selector 30 is actuated. Displacement of the plus (+) or minus (−) directional actuators respectively effect one gear ratio upshift or downshift from such pre-established gear ratio.

A fuel control lever or pedal 4 as shown in FIG. 1 and diagrammed in FIG. 4, has associated therewith an idle position 41, a full throttle position 43 and an intermediate position 42. Such positions of the fuel control 4 are detected by load demand sensor switches 45 and 46, the outputs of which are fed to the electronic unit 2. Infinitely variable types of sensor switch means could also be utilized to supply position data reflecting load demand.

Figure 2:
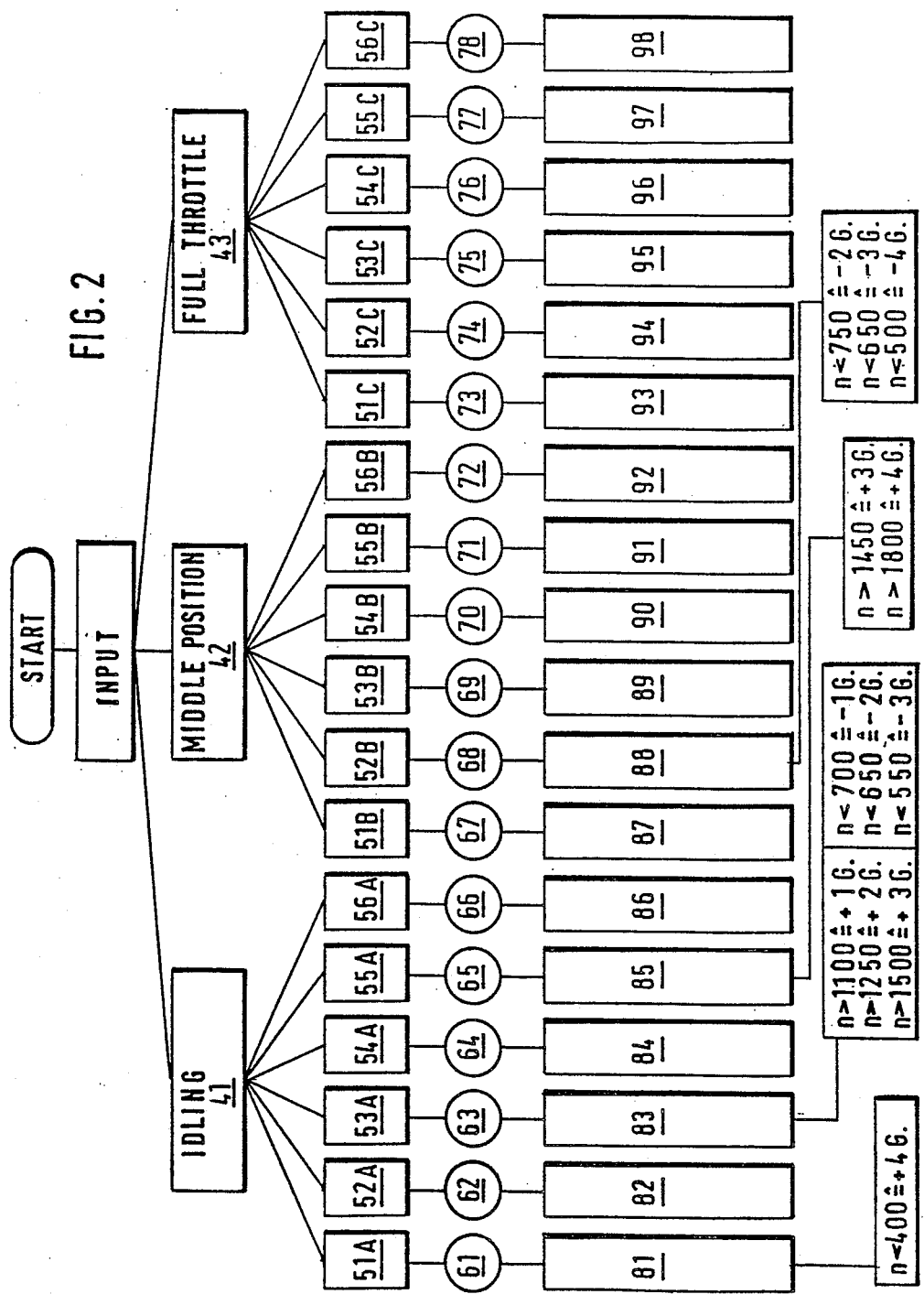
FIG. 2 is a flow chart for determination of gear shift control points and shift commands.

As seen in the flow chart of FIG. 2, the relationship of momentary load demand reflected by the positions of the fuel control 4, aforementioned, to acceleration calculations 51A to 56C, performed by calculator 5 in electronic unit 2, as diagrammed in FIG. 4, is depicted. Such acceleration calculations are performed on the speed signal data received from sensor 21 sensing the output speed of shaft 11 as diagrammed in FIG. 4. In regard to such acceleration calculations: 51A, 51B and 51C reflect high deceleration; 52A, 52B and 52C reflect low deceleration; 53A 53B and 53C reflect constant travel speed; 54A, 54B and 54C reflect low acceleration; 55A, 55B and 55C reflect medium acceleration; and 56A, 56B and 56C reflect high acceleration.

Shifting points 61 to 78 shown in the flow chart of FIG. 2, derived exclusively from the acceleration parameters, represent the occurrence of gear ratio changes without regard to the available gear ratios or established gear ratio. Thus, the number of shifting points does not necessarily agree with the number of gear ratios available through the gear transmission. Instead, each shifting point 66 to 78 is empirically determined by the assignment thereto of different numbers of predetermined shift commands. Thus, one shifting command from a table 81 shown in FIG. 2 is assigned by way of example to one shifting point 61. On the other hand, one shifting point 65 has several shifting commands from table 85 assigned thereto with one of such commands selected to precisely correspond to rotational sped. The shifting commands do not relate to any fixed speed ratio, but correspond only to a gear ratio skip or jump determined automatically with reference to the gear ratio established at the time.

Where several shifting commands in table 85 are assigned to one shifting point 65, as aforementioned, the gear ratio selection is determined by the rotational speed of the engine or the output turbine of converter 16 through sensor 22 supplying its output speed signal to the electrponic unit 2. The selection of the correct commands from the command tables 81–98 assigned to corresponding shift points 61 to 78, is controlled by section 26 diagrammed in FIG. 4. When three commands from table 88 are assigned for example to the shifting point 68, such selection of commands is effected in accordance with the rotational speed of turbine 17. Thus, the conditions in the drive train of the transmission are taken into consideration by data derived from rotational speed through shift point control section 25 applied to the usual drive ratio control section 27 associated with the transmission 1 as diagrammed in FIG. 4.

Figure 3:
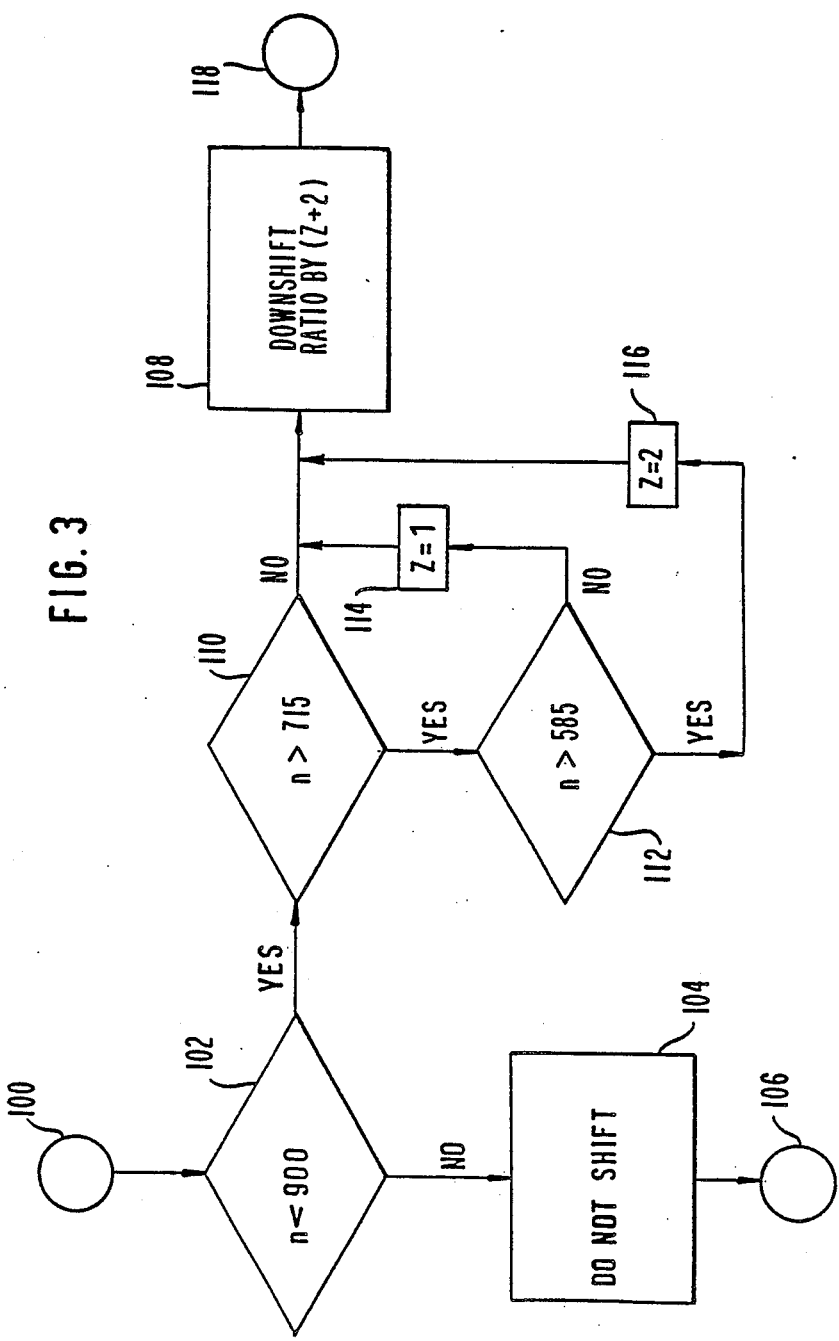
FIG. 3 is a program flow chart with reference to one of the shift control points.

A change in gear ratio in the forward travel range of automatic operation, with the selector 3 or 30 in the D position, occurs as follows. The fuel control pedal 4 is displaced to the intermediate position 42 causing load demand switches 45 and 46 to supply a load demand signal to the electronic unit 2 as diagrammed in FIG. 4. A negative acceleration calculated at 5 in the electronic unit 2 from the signal input fed thereto by sensor 21 measuring the rotational speed of driven shift 11, produces a short delay so that an oprational cycle is initiated at shift point control section 25 in accordance with shifting point 68. Initiation of such operational cycle is diagrammed in the program flow chart of FIG. 3 at start block 100. From the commands in table 88 assigned to shifting point 68, different programmed paths are available as shown in FIG. 3, depending on the rotation of the turbine 17, as follows:

1. When acceleration (n) is above 900 rpm/min. as determined at decision block 102 in FIG. 3, gear shifting operation is blocked at 104 to start a new program at 106.

2. When acceleration (n) is below 900 rpm/min., a shifting operation is effected at 108 to cause downshift by two speed ratios if the acceleration (n) remains above 715 rpm/min. as determined at decision block 110.

3. If the acceleration (n) drops below 715 rpm/min. but remains above 585 rpm/min. as determined at decision block 112 in FIG. 3, a single speed ratio downshift (Z=1) is effected at 108 through enable block 114.

4. When the acceleration (n) drops below 585 rpm/min. as determined at decision block 112, then a two gear ratio downshifts (Z=2) are effected through enable block 116 as diagrammed in FIG. 3.

The foregoing values and shifting commands of the program paths terminated at 106 or 118 as depicted in FIG. 3 are preferably determined empirically, but may also be calculated to correspond approximately to the gear shifting behavior of a good vehicle driver under comparable conditions with manual shift gearing.

For constant speed travel with no acceleration as reflected by shift control points 53A, 53B and 53C, the gear shifting program will depend on all three momentary load demands generated by the positioning of the fuel control pedal 4 between the idle position 41, the intermediate position 42 and the full throttle position 43. A relatively large number of commands for shift to high or reverse gear ratios will be assigned to the shift control points 63, 69 and 75 for this purpose, depending on the rotational output speed attained. While load demand and speed are relied on to control gear shift for constant speed travel, as is already known in the art for automatic gear transmission control, such automatic control is modified by possible skipping of gear ratios in the shift sequence, pursuant to the present invention.

I claim:

1. In a control system for an engine driven variable speed transmission (1) having a plurality of available drive ratios, including selector means (3,30) for rendering the transmission operative in forward (D) and reverse (R) travel conditions, fuel control means (4) responsive to displacement thereof for controlling instantaneous load demand on the engine, vehicle speed sensor means (21) operatively connected to the transmission for sensing output speed thereof, shift point control means (61-78) for effecting automatic change between said drive ratios in accordance with the output speed and the instantaneous load demand, acceleration calculating means (5) operatively connected to the vehicle speed sensor means for modifying the automatic drive ratio change effected by the shift point control means in accordance with acceleration determined from said sensing of the output speed and programmed means (81-98) establishing a plurality of command programs through which skipping of selected ones of the available drive ratios in dependence on driving conditions assigns variable numbers of said drive ratios to the shift point control means for correspondingly limiting said automatic drive ratio change in upshift and downshift directions in the forward travel condition of the transmission.

2. The system as defined in claim 1 wherein the command programs include establishment of said drive ratios forming a high range of speeds in the forward travel condition of the transmission.

3. The system as defined in claim 1 including additional transmission speed sensor means (22,23) for automatically selecting several predetermined programs of said plurality of command programs to which the automatic drive ratio change is limited.

4. The system as defined in claim 1 wherein the shift point control means automatically effects each change in drive ratio independently of previous changes.

5. The system as defined in claim 1 wherein the acceleration is continuously determined by the acceleration calculating means.

6. The system as defined in claim 1 wherein the fuel control means is displaceable between idle, full throttle and int4ermediate throttle positions (41-43) to which acceleration factors are respectively assigned during said determination of the acceleration.

7. The system as defined in claim 1 wherein the acceleration calculating means includes sections (51A-56C) respectively assigned to different load demand positions (41-43) of the fuel control means.

8. The system as defined in claim 1 wherein the load demand of the fuel control means is operative to establish the change in drive ratio effected by the shift point control means (61-78) and the selection of the command programs.

9. The system as defined in claim 1 wherein said selector means includes means for selectively canceling (M) said automatic change in drive ratio and enabling manual change in drive ratio in opposite directions.

10. The system as defined in claim 9 wherein the manual change is effected by additional adjustment of the selector means.

11. The system as defined in claim 1 wherein said automatic drive ratio change is limited by said programmed skipping of up to three of the plurality of available drive ratios.

* * * * *